Patented Sept. 5, 1933

1,925,644

UNITED STATES PATENT OFFICE 1,925,644

PROCESS FOR THE MANUFACTURE OF PHOSPHATES OF THE ALKALI AND ALKALINE EARTH METALS AND OF MAGNESIUM

Vladislav Pristoupil, Aussig on the Elbe, Czechoslovakia

No Drawing. Application March 9, 1931, Serial No. 521,397, and in Czechoslovakia March 15, 1930

7 Claims. (Cl. 23—106)

The present invention relates to a process for the production of phosphates of the alkali and alkaline earth metals and of magnesium having a higher $P_2O_5$ content than the metaphosphates, and to the products obtained thereby. In order to obtain the new preparations the corresponding metaphosphates are treated with phosphorus pentoxide at an elevated temperature. The process may be carried out, for example, by fusing together phosphorus pentoxide in its high-boiling, amorphous or glassy form with the corresponding metaphosphate. There is then obtained a glassy mass the constitution of which has not yet been established. If, for example, 1 molecule $P_2O_5$ is fused together with 1 molecule of calcium metaphosphate, there is formed when the melt solidifies a glassy mass which, surprisingly, is not hygroscopic. Similar products are formed by fusing together phosphorus pentoxide with other metaphosphates, for example with the metaphosphates of magnesium and of the alkali metals.

Instead of fusing together amorphous phosphorus pentoxide with the metaphosphates, which is troublesome to carry out, phosphorus pentoxide vapour may be used as the starting material for the production of the new preparations by causing it to react on the metaphosphates at an elevated temperature. Preferably, the phosphorus pentoxide vapour is formed by the combustion of elemental phosphorus and the heat of combustion is made use of for maintaining the reaction with the metaphosphates. This method of carrying out the process is particularly advantageous since it enables the phosphorus-containing gases, which are formed in the manufacture of phosphorus by the reduction of phosphates, to be directly utilized. For this purpose the phosphorus contained in the phosphorus furnace gases is burnt in known manner to $P_2O_5$ and the heat resulting from this combustion is utilized for maintaining the reaction with the metaphosphate. The available amount of heat can also be still further increased by fully utilizing the CO-content of the phosphorus furnace gases for the development of heat.

Preparations with different contents of $P_2O_5$ can be manufactured by the methods described. Thus, for example, the proportion of $CaO:P_2O_5$ in the calcium-phosphoric acid preparations obtained by the action of phosphorus pentoxide vapour on calcium metaphosphate may be between 1:1 to 1:2. In the same way preparations are obtained from alkali-metaphosphates which exhibit a still higher proportion of $P_2O_5$ to metal.

Example 1

A $P_2O_5$-containing vapour or a $P_2O_5$-containing gas is introduced, in as fine a state of distribution as is conveniently practicable, at a temperature of 1100°–1200° C. into a melt of calcium metaphosphate. The speed of the stream of gas should be regulated according to its content of $P_2O_5$ and according to the depth of the melt. Since it is quickly taken up the speed may be considerable. In this way with quantitative and rapid absorption there can be obtained in the ultimate product a molecular proportion up to $1CaO:2P_2O_5$. If diluted $P_2O_5$ vapour be employed, such as is obtained for example by the combustion of phosphorus furnace gas, a molecular proportion of $1CaO:1.5P_2O_5$ is still easily obtained.

Instead of introducing the $P_2O_5$-containing gas into the metaphosphate melt, the melt can be allowed to trickle or flow through a shaft charged with filling materials in a direction counter to that of the gas.

Example 2

A melt of sodium metaphosphate is treated with $P_2O_5$ vapour or $P_2O_5$-containing gas at 600–800° C., in a similar manner as in Example 1. The products obtained are still richer in phosphoric acid than the corresponding calcium preparations. By using undiluted $P_2O_5$ vapour preparations can be obtained with complete and quick absorption of the $P_2O_5$ in which, for example, the molecular proportion $1Na_2O:3P_2O_5$ is exceeded.

The new preparations, in view of their composition, are particularly suitable for use as fertilizers. They have a $P_2O_5$ content which can be increased to more than 80%, and their solubility is satisfactory for fertilizing purposes. Thus for example a preparation having a composition in which the proportion $CaO:P_2O_5=1:1\frac{1}{2}$ was almost completely dissolved after stirring for about two days in cold water. A particular advantage of the new preparations is that, unlike free phosphoric acid and many phosphates, they are not hygroscopic and consequently possess great covering or spreading power. The solubility can moreover be considerably increased without impairing their covering power, by subjecting the highly heated, preferably molten mass to quick cooling or quenching, care being preferably taken that a large superficial area is formed. The quenching may be effected for example by dropping the melt on to cold iron plates or by allowing it to flow into cold water.

I claim:—

1. Process for the production of phosphates of the alkali and alkaline earth metals and of magnesium having a higher $P_2O_5$ content than the metaphosphates which comprises treating a metaphosphate of one of the said metals with phosphorus pentoxide at glowing heat.

2. Process for the production of phosphates of the alkali and alkaline earth metals and of magnesium having a higher $P_2O_5$ content than the metaphosphates which comprises fusing the amorphous, i. e. glassy, modification of phosphorus pentoxide with a metaphosphate of one of said metals.

3. Process for the production of phosphates of the alkali and alkaline earth metals and of magnesium having a higher $P_2O_5$ content than the metaphosphates which comprises treating a metaphosphate of one of the said metals with phosphorus pentoxide vapour at glowing heat.

4. Process for the production of phosphates of the alkali and alkaline earth metals and of magnesium having a higher $P_2O_5$ content than the metaphosphates which comprises burning elemental phosphorus to form phosphorus pentoxide treating a metaphosphate of one of said metals with the phosphorus pentoxide vapour formed at glowing heat and using the heat of combustion to maintain the reaction temperature.

5. Process for the production of phosphates of the alkali and alkaline earth metals and of magnesium having a higher $P_2O_5$ content than the metaphosphates which comprises treating a metaphosphate of one of the said metals with phosphorus pentoxide at glowing heat and rapidly cooling the product formed.

6. Process for the production of phosphates of the alkali and alkaline earth metals and of magnesium having a higher $P_2O_5$ content than the metaphosphates which comprises fusing the amorphus, i. e. glassy, modification of phosphorus pentoxide with a metaphosphate of one of said metals, and rapidly cooling the product formed.

7. Process for the production of phosphates of the alkali and alkaline earth metals and of magnesium having a higher $P_2O_5$ content than the metaphosphates which comprises treating a metaphosphate of one of the said metals with phosphorus pentoxide at glowing heat and rapidly cooling the product formed by pouring into cold water.

VLADISLAV PŘISTOUPIL.